United States Patent
Ozol et al.

(12)

(10) Patent No.: US 11,897,245 B2
(45) Date of Patent: *Feb. 13, 2024

(54) LAMINATED FABRICS AND PROTECTIVE COVERS WITH POST-INDUSTRIAL AND/OR POST-CONSUMER CONTENT AND METHODS OF MAKING LAMINATED FABRICS AND PROTECTIVE COVERS WITH POST-INDUSTRIAL AND/OR POST CONSUMER CONTENT

(71) Applicant: Transhield, Inc., Elkhart, IN (US)

(72) Inventors: Seckin Ozol, South Bend, IN (US); Na Qi, Granger, IN (US); Gregory L. Todt, Union, MI (US)

(73) Assignee: Transhield, Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,576

(22) Filed: Dec. 20, 2021

(65) Prior Publication Data

US 2022/0111614 A1 Apr. 14, 2022

Related U.S. Application Data

(62) Division of application No. 17/190,805, filed on Mar. 3, 2021, now Pat. No. 11,230,083, which is a division (Continued)

(51) Int. Cl.
*B32B 5/22* (2006.01)
*B32B 5/02* (2006.01)
(Continued)

(52) U.S. Cl.
CPC ............ *B32B 5/022* (2013.01); *B32B 5/08* (2013.01); *B32B 5/24* (2013.01); *B32B 7/028* (2019.01);
(Continued)

(58) Field of Classification Search
CPC .. B32B 5/022; B32B 5/08; B32B 5/24; B32B 7/028; B32B 7/12; B32B 27/06;
(Continued)

(56) References Cited

U.S. PATENT DOCUMENTS 5,077,556 A 12/1991 Aisslinger
5,491,017 A 2/1996 Todt
(Continued)

FOREIGN PATENT DOCUMENTS

WO 2008056123 A1 5/2008

OTHER PUBLICATIONS

Wikipedia page for "polyethylene terephthalate", 15 pages, accessed Dec. 31, 2022.*

(Continued)

*Primary Examiner* — Matthew D Matzek
(74) *Attorney, Agent, or Firm* — Price Heneveld LLP

(57) ABSTRACT

A method of recycling laminated fabrics and laminated fabric products and producing new laminated fabrics and laminated fabric products includes the steps of shredding scrap or used laminated fabric material, melt separating the polymers, pelletizing the melt separated polymers, extruding the pelletized material with at least one virgin material to form a film, and laminating the film to a nonwoven material to form a new laminated fabric. The scrap or recycled laminated fabric products can include plastic/polymer materials having different melting temperatures. The new laminated fabric can be utilized to produce new products, such as protective covers.

29 Claims, 4 Drawing Sheets

Related U.S. Application Data of application No. 17/074,766, filed on Oct. 20, 2020, now Pat. No. 11,155,058.

(60) Provisional application No. 62/923,739, filed on Oct. 21, 2019.

(51) Int. Cl.

| | | |
|---|---|---|
| *B32B 27/12* | (2006.01) | |
| *B32B 27/06* | (2006.01) | |
| *B32B 27/32* | (2006.01) | |
| *B32B 27/36* | (2006.01) | |
| *B32B 7/12* | (2006.01) | |
| *B32B 37/15* | (2006.01) | |
| *B32B 37/12* | (2006.01) | |
| *B32B 7/028* | (2019.01) | |
| *B32B 5/08* | (2006.01) | |
| *B32B 5/24* | (2006.01) | |

(52) U.S. Cl.
CPC ............... *B32B 7/12* (2013.01); *B32B 27/06* (2013.01); *B32B 27/12* (2013.01); *B32B 27/32* (2013.01); *B32B 27/36* (2013.01); *B32B 37/1207* (2013.01); *B32B 37/153* (2013.01); *B32B 2037/1223* (2013.01); *B32B 2307/31* (2013.01); *B32B 2367/00* (2013.01)

(58) Field of Classification Search
CPC ....... B32B 27/12; B32B 27/32; B32B 27/327; B32B 27/36; B32B 37/12; B32B 37/1207; B32B 2037/1223; B32B 2307/31; B32B 2367/00; B32B 2250/02; B32B 37/153; B32B 2262/0253; B32B 2262/0261; B32B 2262/0284; B32B 2307/30; B32B 2307/558; B32B 2307/54; B32B 2307/5825; B32B 2307/718; B32B 2307/732; B32B 2307/736; B32B 2571/00; B29B 17/0412; B29B 2017/0203; B29B 2017/0255; B29B 2017/0476; B29B 17/02; B29B 17/0026; B29K 2023/0633; B29K 2067/003; B29L 2009/00; Y02W 30/52; Y02W 30/62
USPC ............. 428/420; 156/60, 94, 176, 305, 701
See application file for complete search history.

(56) References Cited

U.S. PATENT DOCUMENTS

| | | | |
|---|---|---|---|
| 5,565,158 A | 10/1996 | Sullivan et al. | |
| 5,623,812 A | 4/1997 | Todt | |
| 5,662,978 A * | 9/1997 | Brown | D04H 3/147 |
| | | | 442/364 |
| 5,705,566 A | 1/1998 | Todt | |
| 5,712,008 A | 1/1998 | Todt | |
| 5,840,773 A * | 11/1998 | Booij | C08J 11/08 |
| | | | 528/495 |
| 5,888,616 A | 3/1999 | Ang | |
| 6,045,900 A * | 4/2000 | Haffner | B32B 27/32 |
| | | | 428/317.9 |
| 6,444,595 B1 | 9/2002 | Elkouh et al. | |
| 6,562,740 B1 | 5/2003 | Todt | |
| 6,638,589 B1 | 10/2003 | Jarvenkyla | |
| 6,794,317 B2 | 9/2004 | Elkouh et al. | |
| 6,875,712 B2 | 4/2005 | Todt | |
| 7,183,230 B2 | 2/2007 | Elkouh et al. | |
| 7,344,765 B2 | 3/2008 | Hayakawa et al. | |
| 8,012,572 B2 | 9/2011 | Ramli et al. | |
| 8,465,684 B1 | 6/2013 | Tsai | |
| 8,637,139 B2 | 1/2014 | Todt et al. | |
| 8,828,487 B2 | 9/2014 | Todt et al. | |
| 8,871,319 B2 | 10/2014 | Stanley et al. | |
| 8,883,284 B2 | 11/2014 | Todt et al. | |
| 11,230,083 B2 * | 1/2022 | Ozol | B32B 27/06 |
| 2003/0218367 A1* | 11/2003 | Parker | B60N 2/6027 |
| | | | 297/229 |
| 2013/0040092 A1* | 2/2013 | Moore | B29C 33/26 |
| | | | 428/71 |
| 2015/0018461 A1* | 1/2015 | Todt | C09J 7/387 |
| | | | 366/84 |
| 2015/0123304 A1 | 5/2015 | Ashraf et al. | |
| 2021/0023815 A1* | 1/2021 | Venugopal | D04H 1/46 |

OTHER PUBLICATIONS

Wikipedia page for "polyethylene", 11 pages, accessed Dec. 31, 2022.*

CHEMbaseNET (Polyethylene, Polyethylene Terephthalate) (Year: 2023).*

* cited by examiner

LAMINATED FABRICS AND PROTECTIVE COVERS WITH POST-INDUSTRIAL AND/OR POST-CONSUMER CONTENT AND METHODS OF MAKING LAMINATED FABRICS AND PROTECTIVE COVERS WITH POST-INDUSTRIAL AND/OR POST CONSUMER CONTENT

This application is a divisional application claiming priority from U.S. patent application Ser. No. 17/190,805, filed Mar. 3, 2021, now U.S. Pat. No. 11,230,083, which is a divisional application claiming priority from U.S. patent application Ser. No. 17/074,766, filed Oct. 20, 2020, now U.S. Pat. No. 11,155,058 which claims priority from U.S. Provisional Patent Application Ser. No. 62/923,739, filed Oct. 21, 2019. The disclosures of all of the above-referenced applications are hereby incorporated in their entireties by reference.

The present invention relates to laminated fabrics and protective covers and, in particular, to laminated fabrics and protective covers that include post-industrial ("PI") and/or post-consumer ("PC") content and methods of making them.

BACKGROUND OF THE INVENTION

Laminated and shrinkable protective covers have been widely used for industrial shipping and storage applications for more than twenty five years. Examples of such covers are discussed in U.S. Pat. Nos. 5,491,017, 5,623,812, 5,705,566, 5,712,008, 6,562,740 and 8,637,139.

Known laminated protective covers are often constructed from laminated fabric having layers made from multiple polymers. These polymers often have different melting temperatures ("Tm"), which may vary significantly from polymer to polymer. It is advantageous when recycling plastics to process materials that have similar properties, such as melting temperatures, together. This is one reason why recyclable plastic products typically include ASTM International Resin Identification Codes indicating the type of plastic from which the product is made. The current ASTM coding system is as follows:

TABLE 1

| ASTM Code | Material |
|---|---|
| 1 | Polyethylene Terephthalate (PET or PETE) |
| 2 | High Density Polyethylene (HDPE) |
| 3 | Polyvinyl Chloride (PVC) |
| 4 | Low Density Polyethylene (LDPE) |
| 5 | Polypropylene (PP) |
| 6 | Polystyrene (PS) |
| 7 | other plastics, such as acrylic, nylon, polycarbonate and polylactic acid (PLA) |

Recycling facilities may only accept items for recycling that are made from particular materials, due to the equipment capabilities of the facility.

Laminated fabrics that are designed for use as protective covers are often constructed from a film, an adhesive material and a nonwoven material. The film often includes polyethylene ("PE"), including branched and/or linear PE polymers, such as low density polyethylene ("LDPE") or its branched or unbranched copolymers, such as ethylene vinyl acrylate ("EVA"), ethylene methyl acrylate ("EMA"), ethylene butyl acrylate ("EBA") or linear low density polyethylene ("LLDPE"). The film may or may not be shrinkable. The film often includes UV and antioxidant additives as well as pigments for color.

The adhesive used in these laminated fabrics are often hot melt adhesives designed for outdoor use, so they tend to include saturated block-co-polymers.

The nonwoven layer is typically the layer with the highest melting temperature polymer. In many instances, the nonwoven is a PET. Other polymers, such as nylons, are also used for the nonwoven layer.

Laminated fabrics and covers that have a film made from PE, such as, for example, LDPE (a Code 4 plastic), and a nonwoven layer made from PET (a Code 1 plastic) are often not accepted by recycling facilities because of the significantly different melting temperatures of these materials. For example, LDPE and its copolymers have a melting temperature range of about 85-110 degrees Celsius, whereas PET has a melting temperature as low as about 245 degrees Celsius. The presence of hot melt adhesive between the film layer and nonwoven layer adds another level of complexity to most recycling operations.

SUMMARY OF THE INVENTION

The present invention includes methods of recycling products, such as laminated fabrics and protective covers, that include plastic/polymer materials having significantly different melting temperatures, such as protective covers that include a film having a polyethylene polymer, such as, for example, LDPE, and a nonwoven layer having PET. In one embodiment of the invention, the melting temperature difference is greater than 100 degrees Celsius. In other embodiments, the melting temperature difference is between about 10% and about 225%. The processed recycled material can be used to produce other products, such as new protective covers. For example, according to one embodiment of the present invention, a method of recycling laminated fabrics and laminated fabric products and producing new laminated fabrics includes the steps of shredding the scrap or used laminated fabric, melt separating the polymers, pelletizing the melt separated polymers, extruding the pelletized material with at least one virgin material to form a film, and laminating the film to a nonwoven material to form a new laminated fabric. According to embodiments of the invention, the polymers do not have to be completely separated, either before or after pelletizing.

In one embodiment of the present invention, a method of protecting an object with a cover includes the steps of obtaining a laminated fabric including material from a recycled laminated fabric product, the recycled laminated fabric product having a first component having a melting point and a second component having a melting point different from the melting point of the first component, the laminated fabric further including (a) a film layer including at least some of the first component from the recycled laminated fabric product and at least one virgin polymer resin, (b) a nonwoven layer, and (c) an adhesive between the film layer and the nonwoven layer; forming the laminated fabric into a cover; and placing the cover over the object to be protected.

In one embodiment, the recycled laminated fabric product is heat shrinkable.

In another embodiment, the content of material from the recycled laminated fabric product is less than 90% by weight of the laminated fabric. In certain embodiments, the content of material from the recycled laminated fabric product is greater than 1% by weight of the laminated fabric.

In one embodiment, the first component of the recycled laminated fabric product is a polyethylene polymer.

In some embodiments, the second component of the recycled laminated fabric product is PET.

In other embodiments, the film layer includes at least some of the second component from the recycled laminated fabric product.

In another embodiment, the laminated fabric is heat sealable.

In one embodiment, the first component of the recycled laminated fabric product and the at least one virgin resin are the same material.

In certain embodiments, the nonwoven layer is constructed at least in part from recycled material.

In other embodiments, the nonwoven layer is constructed entirely from recycled material.

In one embodiment, forming the laminated fabric into a cover includes cutting the laminated fabric to a desired size. In other embodiments, forming the laminated fabric into a cover includes cutting the laminated fabric to a desired shape. In yet another embodiment, forming the laminated fabric into a cover includes forming the laminated fabric into a desired shape.

In some embodiments, the method further includes applying heat to the cover after the cover is placed over the item to be protected.

In one embodiment of the present invention, a method of protecting an object with a cover includes the steps of making a laminated fabric by a process that includes the steps of (a) obtaining an existing laminated fabric product, the existing laminated fabric product having a first component having a first melting point and a second component having a second melting point different from the melting point of the first component, (b) separating the first component of the existing laminated fabric product from the second component of the existing laminated fabric product, (c) forming the first component of the existing laminated fabric product into pellets, (d) providing at least one virgin polymer resin, (e) forming the pellets and the at least one virgin polymer resin into a film, (f) providing a nonwoven material, and (g) laminating the film to the nonwoven material; forming the laminated fabric into a cover; and placing the cover over the item to be protected.

In one embodiment, the step of separating the first component of the existing laminated fabric product from the second component of the existing laminated fabric product is performed by melt separation.

In another embodiment, the first component of the existing laminated fabric product and the at least one virgin polymer resin are the same material.

In some embodiments, the pellets and the at least one virgin polymer resin are extruded to form a cast film. In certain embodiments, the pellets and the at least one virgin polymer resin are extruded to form a blown film.

In one embodiment, the laminated fabric is heat shrinkable.

In another embodiment, the first component of the existing laminated fabric product is a polyethylene polymer.

In certain embodiments, the second component of the existing laminated fabric product is PET.

In some embodiments, the laminated fabric is heat sealable.

In one embodiment, the method further includes providing a second film and coextruding the film with the second film to form a multilayer film that is laminated to the nonwoven material.

In another embodiment, forming the laminated fabric into a cover includes cutting the laminated fabric to a desired size. In some embodiments, forming the laminated fabric into a cover includes cutting the laminated fabric to a desired shape. In one embodiment, forming the laminated fabric into a cover includes forming the laminated fabric into a desired shape.

In another embodiment, the method further includes applying heat to the cover after the cover is placed over the item to be protected.

Other features of the present invention will be apparent from the following Detailed Description of Embodiments of the Invention and the accompanying drawings.

DETAILED DESCRIPTION OF EMBODIMENTS OF THE INVENTION

Certain embodiments of the invention described below are illustrated in the context of laminated fabrics including a film constructed at least in part from LDPE. However, it is to be understood that reference to LDPE is for purposes of example only. The invention is equally applicable to, and embodiments of the invention encompass, processing and manufacturing laminated fabrics and products that include laminated fabrics having films constructed in whole or in part from PE and/or one or more PE copolymers other than, instead of, or in addition to LDPE.

Figure 1:
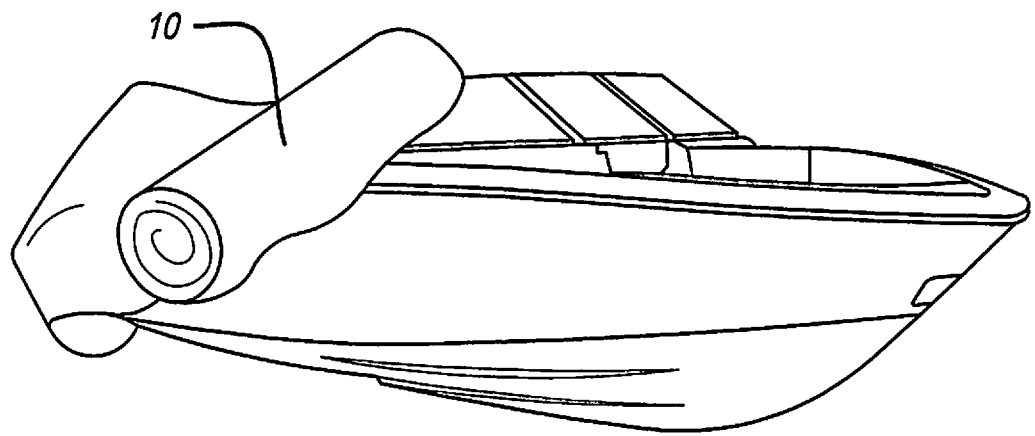
FIG. 1 is a perspective view of a protective cover being collected for recycling according to methods of the present invention.

Referring to FIGS. 1-5, one embodiment of the present invention includes the following steps:

Step 1—Collect material to be recycled, such as scrap laminated fabric resulting from manufacturing processes or used protective covers. For example, as shown in FIG. 1, a used protective cover 10 (such as a boat cover) can be obtained for processing according to embodiments of the present invention.

Figure 2:
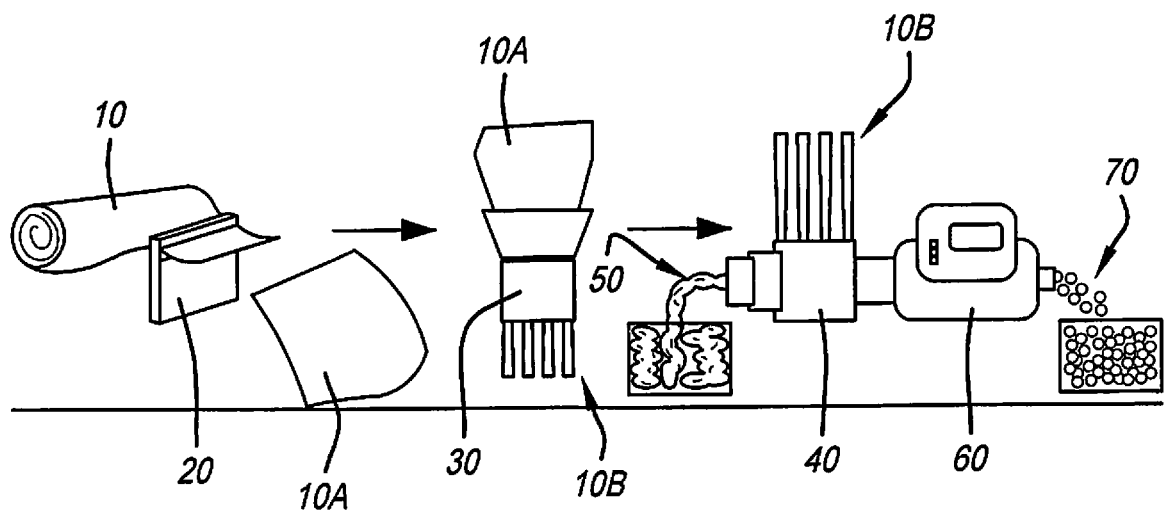
FIG. 2 illustrates the protective cover shown in FIG. 1 being processed according to certain steps of embodiments of the present invention to produce a pelletized material.

Step 2—Separate PET from LDPE in the material to be recycled and pelletize the plastics. For example, as shown in FIG. 2, used protective cover 10 can be processed through a slitting or cutting apparatus 20 to produce sections 10A of used protective cover 10.

Step 2a—Shredding the material to be recycled, such as, for example, processing sections 10A of used protective cover 10 through a shredder 30 to produce shredded product 10B that includes both the film component and the nonwoven component of used protective cover 10.

Step 2b—Melt separate PET from LDPE in the shredded product. For example, as shown in FIG. 2, shredded product 10B can be processed through an extruder 40 to separate the PET and LDPE into a PET product stream 50 and an LDPE product stream. Note that in certain embodiments of the present invention, the PET and LDPE are completely separated to form PET product stream 50 and an LDPE product stream. In other embodiments, some LDPE, adhesive or other material may remain in PET product stream 50 and some PET, adhesive or other material may remain in the LDPE product stream. In one embodiment, 6%-12% by weight of the LDPE product stream is PET. However, a majority of PET product stream 50 is PET and a majority of the LDPE product stream is LDPE. In one embodiment, the melt separation step is performed using an Ettlinger ERF-350 Melt Filter with a 120 micron screen installed on a Next Generation Recycling Machines, Inc. ("NGR") 85 mm Extruder. The extruder is available from Next Generation Recycling Machines, Inc. of Norcross, Ga.

Step 2c—Pelletize the LDPE product stream. For example, as shown in FIG. 2, the LDPE product stream can be processed through a hot die ("HD") pelletizer 60 to produce pellets 70. Pellets 70 are primarily LDPE, however, as noted above, because some PET may remain in the LDPE product stream, pellets 70 may be a mixture of LDPE and PET. Adhesive, color or other masterbatches, and other components of shredded product 10B may also be present in pellets 70.

Figure 3:
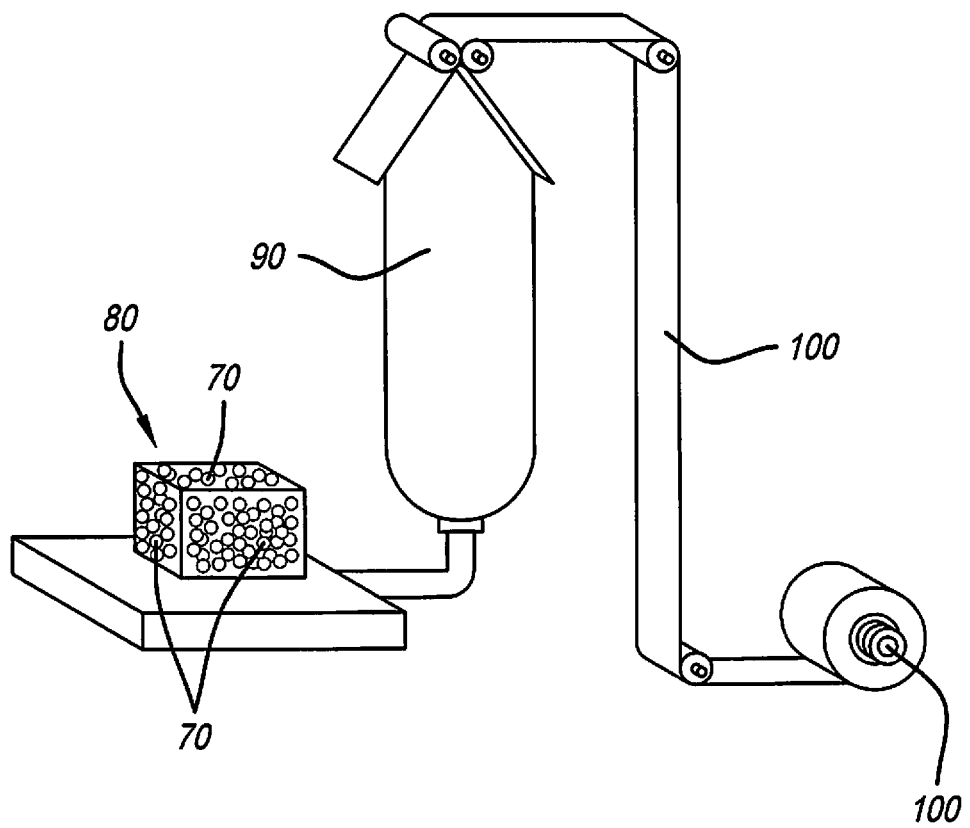
FIG. 3 is a perspective view of the pelletized material shown in FIG. 2 being processed according to certain steps of embodiments of the present invention to form a film.

Step 3—Produce a film by extruding the pelletized material with virgin resin. For example, as shown in FIG. 3, pellets 70 can be combined with virgin LDPE resin to form a starting material 80 that is processed through an extruder 90 to produce a film 100. Note that in certain embodiments of the invention, one or more virgin resins may extruded with pellets 70. For example, pellets 70 can be extruded with both LDPE and LLDPE virgin resin at the same time to produce film 100.

Figure 4:
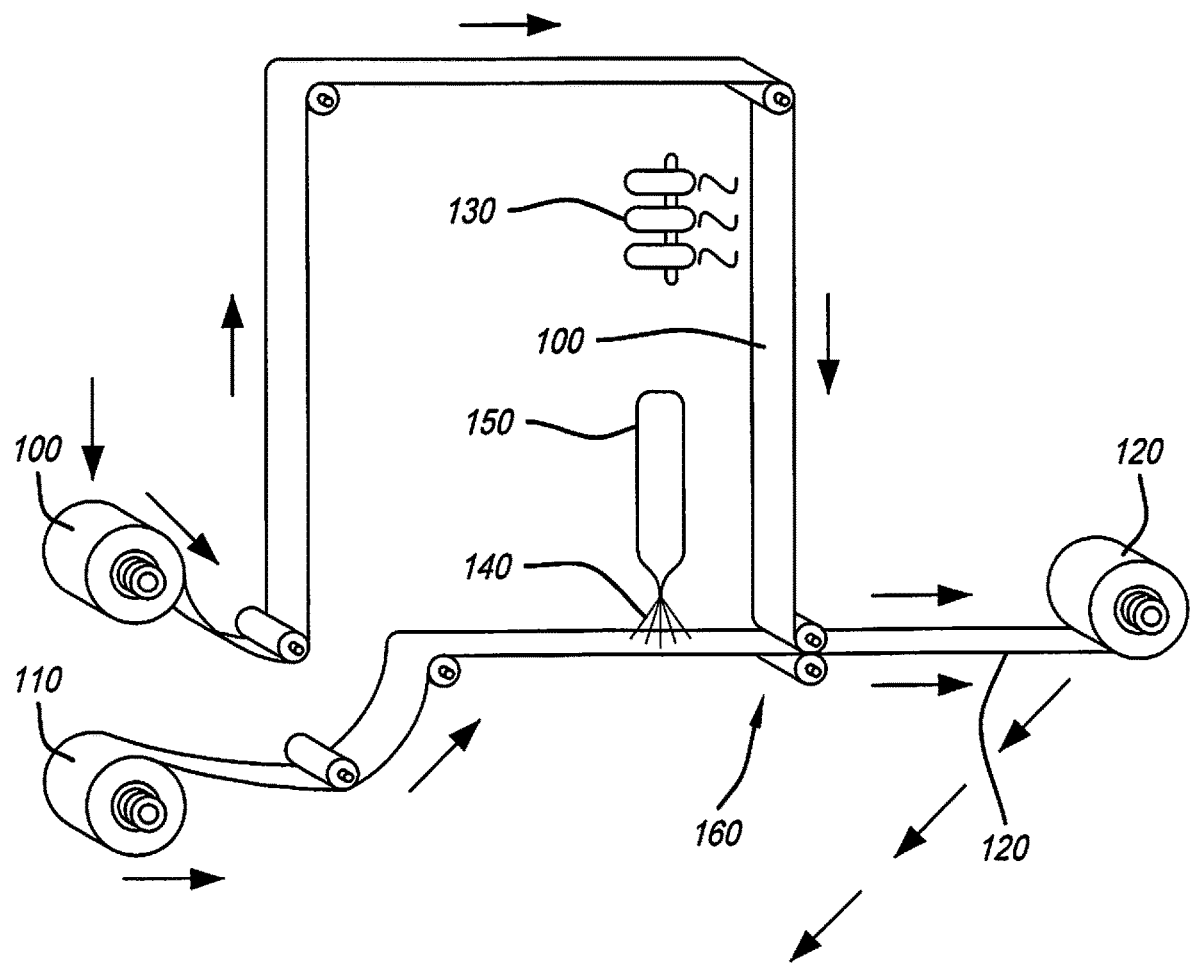
FIG. 4 is a perspective view of the film shown in FIG. 3 being processed according to certain steps of embodiments of the present invention to form a laminated fabric.

Step 4—Laminate the film to nonwoven material to form a laminated fabric. For example, as shown in FIG. 4, film 100 can be laminated to a nonwoven material 110 to produce a laminated fabric 120. In the embodiment of the invention shown in FIG. 4, this is accomplished by heating film 100 at a heating station 130, applying adhesive 140 to nonwoven material 110 at a spraying station 150, and processing film 100 and nonwoven material 110 through lamination rollers 160.

Figure 5:
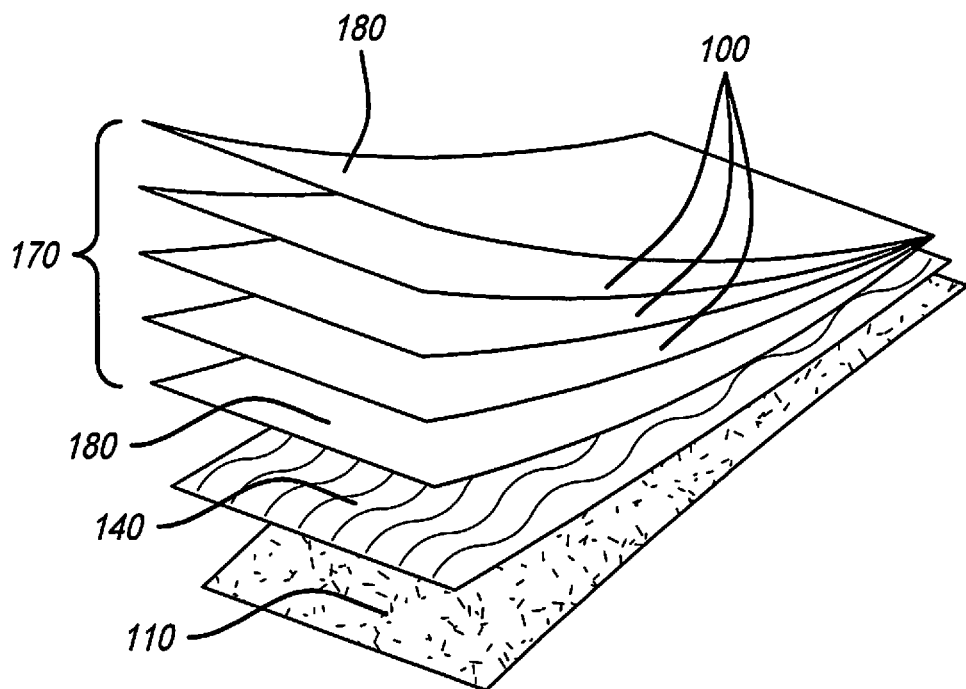
FIG. 5 is a perspective view of a laminated fabric according to one embodiment of the present invention.

In other embodiments of the invention, film 100 is coextruded with virgin film to form a multilayer film that can be laminated to nonwoven material 110 utilizing adhesive 140. For example, as shown in FIG. 5, a multilayer film 170 can be formed having one or more layers of film 100 and one or more layers of virgin film 180. Note that although layers 100 are shown as located between the two layers of virgin film 180, they can be located in any arrangement with respect to the layers of virgin film 180.

In other embodiments of the invention, the layers of film 100 are coextruded with the layers of virgin film 180 to form multilayer film 170, which is then laminated to nonwoven material 110 in a single step process like that shown in FIG. 4.

Figure 6:
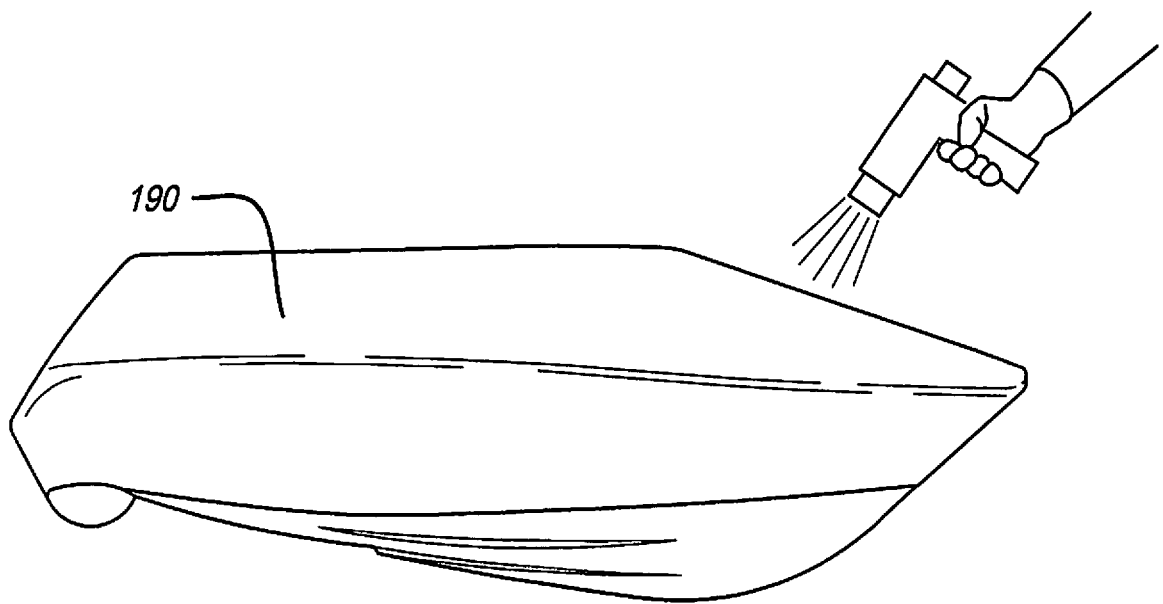
FIG. 6 is a perspective view of a new protective cover produced from a laminated fabric according to embodiments of the present invention.

Step 5—Form a new protective cover. For example, laminated fabric 120 can be used to form a new protective cover, such as a boat cover 190 (FIG. 6).

In one embodiment of the invention, the equipment and operating parameters that may be utilized for Step 2 above are indicated in the following table:

TABLE 2

| Reference Number (Shipping Covers) | LDPE Film and PET Fibers |
| --- | --- |
| Product Description | High Temp Run |
| Extruder Manufacturer | NGR |
| Screw Configuration (Single/Twin) | single |
| Extruder Screw Diameter | 85 mm |
| Vented (Yes/No) | yes single |
| Extruder Screw Speed | 100 |
| Extruder Workload (%) | 78 |
| Extruder Temperature | 230° C. |
| Vent Purge Pressure (PSI) | minor |
| Filter Type (ECO/ERF) | ERF 350 |
| Screen Fineness (mm) | 0.125 |
| Operating Temperature | 260° C. |
| Capacity (kg/h) | 101.6 |
| Purge Amount (kg/h) | 12.7 |
| Purge Amount (%) | 12.50% |
| Filter Inlet Pressure (kPa) | 579 |
| Filter Screen Pressure (kPa) | 262 |
| Filter Exit Pressure (kPa) | 317 |
| Filter Drum Speed (RPM) | 11.4 |
| Exit Screw/Shaft Speed (RPM) | 26.7 |
| Inlet Temperature | 118° C. |
| Outlet Temperature | 119° C. |

It has been found that use of methods according to the present invention permits the successful manufacture of laminated fabrics and protective covers even if there is not complete separation of the LDPE from the PET. For example, in one embodiment of the invention, pelletized material that included 10% PET content, less than 2% styrene-ethylene butylene-styrene ("SEBS") hot melt adhesive and the remainder LDPE was able to be extruded and blown to produce a film that has acceptable physical properties for use in the production of protective covers. In one embodiment of the invention, up to 50% virgin LDPE resin is used in the film. Use of 20% recycled pelletized material in the film results in a final laminated fabric that includes about 15%-16% postindustrial/postconsumer plastic by weight. The percentage can be increased further if the nonwoven utilized to make the new laminated fabric is manufactured from recycled polymers as well. For example, nonwoven material 110 could be manufactured from recycled PET. Doing so would bring the total recycled content of the final laminated fabric to about 35% by weight.

Product by weight before and after recycling is described on the following table:

TABLE 3

| Initial Laminate/Cover Composition | *Weight (gsm) | *Weight Percent |
| --- | --- | --- |
| Total Weight | 226 | 100% |
| Film (LDPE/LLDPE) | 180 | 79.6% |
| Adhesive (SEBS) | 4 | 1.8% |
| Nonwoven (PET) | 42 | 18.6% |
| Total Recycled Resin | 0 | 0 |
| | | Weight Percent |
| Recycled Pellet Content | | |
| LDPE/LLDPE | | 90% |
| Adhesive | | Negligible |
| PET | | 10% |

TABLE 3-continued

Film w/PI and PC Content

| | | |
|---|---|---|
| Recycled Resin | | 20% |
| Virgin LDPE | | 30% |
| Virgin LLDPE | | 50% |

| Final Laminated Fabric Composition | Weight (gsm) | Weight Percent |
|---|---|---|
| Total Weight | 226 | 100% |
| Film (LDPE/LLDPE) | 180 | 79.6% |
| Adhesive (SEBS) | 4 | 1.8% |
| Nonwoven (PET)** | 42 | 18.6% |
| Total Recycled Resin Content in the Final Laminated Fabric** | 36 | 16% |

*Numbers are rounded to the nearest integer.
**If the nonwoven used were 100% recycled PET, the total recycled content of the laminated fabric could be as high as 35% by weight.

The example above shows that by use of melt-separation and pelletizing, two different polymer systems can be recycled together and used to produce a film that can further be laminated to form laminated fabrics and cut and sewn into covers for shipping and storage applications. In the non-limiting example provided above, the recycled content is between 10% and 35% by weight.

In another embodiment of the invention, the nonwoven material utilized for the newly made laminated fabric is made from PLA polymers, which makes the laminated fabric partially biodegradable. Furthermore, because PLA can be produced from renewable plant-based resources (as opposed to fossil fuels) it can provide additional environmental benefits.

Tables 4-6 disclose and describe properties of a film (Formula 1) produced without the use of recycled materials according to the present invention and two films (Formulas 2-3) according to embodiments of the present invention produced according to methods of the present invention. In the embodiments disclosed and discussed below, the films were produced on a blown film line utilizing pellets 70 according to embodiments of the present invention that contain 88% LDPE/LLDPE and 12% PET, virgin EXCEED® 1012 LLDPE (available from Exxon Mobile Corporation), and a color and additive masterbatch.

TABLE 4

| | Formula 1 | Formula 2 | Formula 3 |
|---|---|---|---|
| LLDPE (1012) (wt. % 0) | 90 | 80 | 70 |
| Master Batch (wt. % 0) | 10 | 10 | 10 |
| Pellets 70 (wt. % 0) | 0 | 10 | 20 |

Extruder and blown film line parameters for the above formulas are shown below:

TABLE 5

| | Formula 1 | Formula 2 | Formula 3 |
|---|---|---|---|
| Die Diameter (cm) | 5.08 | 5.08 | 5.08 |
| Gauge (mm) | 0.127 | 0.127 | 0.127 |
| BUR | 1 | 1 | 1 |
| Lay Flat (cm) | 9.2 | 9.2 | 9.2 |
| Extrusion rate (g/min) | 21.3 | 21.3 | 21.3 |
| Die factor (g/min/cm die circumference) | 0.114 | 0.114 | 0.114 |

TABLE 5-continued

| | Formula 1 | Formula 2 | Formula 3 |
|---|---|---|---|
| Die Gap (mm) | 0.762 | 0.762 | 0.762 |
| Target Frost Line Height (cm) | 5.08 | 5.08 | 5.08 |
| Target Line Speed (m/min) | 1.22 | 1.22 | 1.22 |
| Melt Temperature Profile (° C.) | | | |
| Zone 1 - Ext. | 202 | 202 | 202 |
| Zone 2 - Ext | 207 | 207 | 207 |
| Zone 3 - Ext | 210 | 210 | 210 |
| Post Extruder Temperature Profile (° C.) | | | |
| a. Die Zone #1-#4 | 210 | 210 | 210 |
| b. Air Ring | Ambient | Ambient | Ambient |
| Machine Load % | 46 | 46 | 47 |

These film had the following properties:

TABLE 6

| | Formula 1 | Formula 2 | Formula 3 |
|---|---|---|---|
| Thickness (mm) | 0.112 | 0.138 | 0.121 |
| Basis Weight (gsm) | 96.1 | 91.9 | 89.8 |
| Puncture (kg) | 8.39 | 6.26 | 5.26 |
| Elmendorf Tear (grams) Machine Direction | 1802.24 | 1500.16 | 1960.96 |
| Elmendorf Tear (grams) Cross Direction | 1966.08 | 2042.88 | 2411.52 |
| Tensile Strength (MPa) Machine Direction | 42.0 | 26.0 | 26.2 |
| Tensile Strength (MPa) Cross Direction | 40.7 | 22.3 | 23.7 |
| Yield Strength (MPa) Machine Direction | 9.0 | 7.0 | 8.2 |
| Yield Strength (MPa) Cross Direction | 9.0 | 6.3 | 6.8 |
| Break Elongation (%) Machine Direction | 610.3 | 582.79 | 583.17 |
| Break Elongation (%) Cross Direction | 609.61 | 564.85 | 587.97 |
| Break Load (kg) Machine Direction | 12.15 | 9.31 | 8.20 |
| Break Load (kg) Cross Direction | 11.78 | 8.01 | 7.39 |
| 2% Modulus (MPa) Machine Direction | 130.0 | 109.2 | 139.5 |
| 2% Modulus (MPa) Cross Direction | 137.7 | 114.0 | 141.5 |

Although the present invention has been described in detail, the same is for purposes of illustration only and is not to be taken as a limitation on the scope of the invention. Numerous modifications can be made to the embodiments described above without departing from the scope of the invention. For example, product containing polymers and materials other than those specifically discussed can be processed according to methods of the present invention to produce laminated fabrics according to embodiments of the present invention. New products other than protective coves can be produced from laminated fabrics according to the present invention. Other variations are also within the scope of the present invention.

What is claimed is:

1. A method of protecting an object with a cover, including the steps of:
obtaining a laminated fabric including material from a recycled laminated fabric product, the recycled laminated fabric product having a first component that is a polymer, the first component having a melting point, and a second component having a melting point differing from the melting point of the first component by at least 100° C., the laminated fabric further including (a) a film layer including at least some of the first component from the recycled laminated fabric product and at least one virgin polymer resin, (b) a nonwoven layer, and (c) an adhesive between the film layer and the nonwoven layer;

forming the laminated fabric into a cover; and placing the cover over the object to be protected;

wherein the step of obtaining a laminated fabric icluding material the recycled laminated fabric product includes making the laminated fabric by a process that includes the steps of (a) obtaining an existing laminated fabric product, the existing laminated fabric product having the first component and the second component (b) separating the first component of the existing laminated fabric product from the second component of the existing laminated fabric product, (c) forming the first component of the existing laminated fabric product into pellets, (d) providing the least one virgin polymer resin, (e) forming the pellets and the at least one virgin polymer resin into a film, (f) providing the nonwoven material, and (g) laminating the film to the nonwoven material via the adhesive.

2. The method of claim 1, wherein the recycled laminated fabric product is heat shrinkable.

3. The method of claim 1, wherein the content of material from the recycled laminated fabric product is less than 90% by weight of the laminated fabric.

4. The method of claim 1, wherein the content of material from the recycled laminated fabric product is greater than 1% by weight of the laminated fabric.

5. The method of claim 1, wherein the first component of the recycled laminated fabric product is a polyethylene polymer.

6. The method of claim 1, wherein the second component of the recycled laminated fabric product is PET.

7. The method of claim 1, wherein the film layer includes at least some of the second component from the recycled laminated fabric product.

8. The method of claim 1, wherein the laminated fabric is heat sealable.

9. The method of claim 1, wherein the first component of the recycled laminated fabric product and the at least one virgin resin are the same material.

10. The method of claim 1, wherein the nonwoven layer is constructed at least in part from recycled material.

11. The method of claim 1, wherein, the nonwoven layer is constructed entirely from recycled material.

12. The method of claim 1, wherein forming the laminated fabric into a cover includes cutting the laminated fabric to a desired size.

13. The method of claim 1, wherein forming the laminated fabric into a cover includes cutting the laminated fabric to a desired shape.

14. The method of claim 1, wherein forming the laminated fabric into a cover includes forming the laminated fabric into a desired shape.

15. The method of claim 2, further including the step of applying heat to the cover after the cover is placed over the item to be protected.

16. The method according to claim 1, wherein the step of separating the first component of the existing laminated fabric product from the second component of the existing laminated fabric product is performed by melt separation.

17. The method of claim 1, wherein the first component of the existing laminated fabric product and the at least one virgin polymer resin are the same material.

18. The method of claim 1, wherein the pellets and the at least one virgin polymer resin are extruded to form a blown film.

19. The method of claim 1, wherein the laminated fabric is heat shrinkable.

20. The method of claim 1, wherein the first component of the existing laminated fabric product is a polyethylene polymer.

21. The method of claim 1, wherein the second component of the existing laminated fabric product is PET.

22. The method of claim 1, wherein the laminated fabric is heat sealable.

23. The method of claim 1, further including the step of providing a second film and coextruding the film with the second film to form a multilayer film that is laminated to the nonwoven material.

24. The method of claim 1, wherein forming the laminated fabric into a cover includes cutting the laminated fabric to a desired size.

25. The method of claim 1, wherein forming the laminated fabric into a cover includes cutting the laminated fabric to a desired shape.

26. The method of claim 1. wherein forming the laminated fabric into a cover includes forming the laminated fabric into a desired shape.

27. The method of claim 19, further including the step of applying heat to the cover after the cover is placed over the item to be protected.

28. The method of claim 1, wherein the laminated fabric is heat shrinkable.

29. The method of claim 1, wherein the pellets include 6-12% PET by weight.

* * * * *

UNITED STATES PATENT AND TRADEMARK OFFICE
CERTIFICATE OF CORRECTION

PATENT NO. : 11,897,245 B2
APPLICATION NO. : 17/555576
DATED : February 13, 2024
INVENTOR(S) : Seckin Ozol et al.

It is certified that error appears in the above-identified patent and that said Letters Patent is hereby corrected as shown below:

On the Title Page

Title, Lines 6-7:
"POST CONSUMER" should be — POST-CONSUMER —

In the Specification

Column 1, Lines 6-7:
"POST CONSUMER" should be — POST-CONSUMER —

Column 2, Line 4:
"are" should be — is —

Column 2, Lines 8-9:
After "nonwoven" insert -- layer --

Column 5, Line 37:
After "may" insert -- be --

Column 6, Line 42:
"postindustrial/postconsumer" should be — post-industrial/post-consumer —

Column 6, Line 44:
After "nonwoven" insert -- material --

Column 7, Table 3, Line 2:
After "Film w/PI and PC Content" insert -- Weight Percent --

Column 7, Line 17:
After "nonwoven" insert -- material --

Signed and Sealed this
   Twenty-fourth Day of September, 2024

Katherine Kelly Vidal
*Director of the United States Patent and Trademark Office*

CERTIFICATE OF CORRECTION (continued)
U.S. Pat. No. 11,897,245 B2

Column 7, Line 42:
"Mobile" should be — Mobil —

Column 8, Line 17:
"film" should be — films —

Column 8, Line 55:
"coves" should be — covers —

In the Claims

Column 9, Claim 1, Line 9:
"a" should be — the —

Column 9, Claim 1, Line 9:
"icluding" should be — including —

Column 9, Claim 1, Line 10:
After "material" insert -- , --

Column 9, Claim 1, Line 14:
After "component" (2nd occurrence) insert -- , --

Column 9, Claim 11, Line 47:
Delete "," (2nd occurrence)

Column 10, Claim 26, Line 41:
"1." should be — 1, —